(12) United States Patent
Martignon

(10) Patent No.: US 6,604,346 B1
(45) Date of Patent: Aug. 12, 2003

(54) GARDENING VEHICLE SUCH AS A LAWN-MOWER OR THE LIKE

(75) Inventor: Girolamo Martignon, Borgoricco (IT)

(73) Assignee: Antonio Carraro S.p.A., Campodarsego (IT)

( * ) Notice: Subject to any disclaimer, the term of this patent is extended or adjusted under 35 U.S.C. 154(b) by 350 days.

(21) Appl. No.: 09/614,253

(22) Filed: Jul. 12, 2000

(30) Foreign Application Priority Data

Jul. 15, 1999 (IT) .......................................... PD99A0166

(51) Int. Cl.[7] .......................... A01B 35/264; A01D 73/00
(52) U.S. Cl. ............................................. 56/1; 180/265
(58) Field of Search .................................. 56/14.6–15.4, 56/16.6, 13.3; 280/400, 492, 782; 180/265, 236, 235, 254, 419; 403/147, 371

(56) References Cited

U.S. PATENT DOCUMENTS

| 2,510,261 A | | 6/1950 | Sharpe |
| 3,299,982 A | | 1/1967 | Bacon |
| 3,347,577 A | * | 10/1967 | Carlson et al. ............. 180/265 |
| 3,411,809 A | * | 11/1968 | Kampert et al. ............ 180/265 |
| 3,521,720 A | * | 7/1970 | Korotkin .................... 180/265 |
| 4,034,822 A | * | 7/1977 | Stedman ....................... 180/51 |
| 4,042,053 A | * | 8/1977 | Sieren et al. .................. 180/51 |
| 4,245,714 A | * | 1/1981 | Kersey ........................ 180/265 |
| 4,414,794 A | | 11/1983 | Riedinger |
| 4,974,400 A | * | 12/1990 | Chubey et al. .......... 56/10.2 R |
| 5,865,258 A | * | 2/1999 | McGrew, II .................. 172/22 |

FOREIGN PATENT DOCUMENTS

| DE | 30 45 353 | 7/1982 |
| EP | 0 213 096 | 3/1987 |
| FR | 2 534 442 | 4/1984 |

* cited by examiner

Primary Examiner—Robert E. Pezzuto
(74) Attorney, Agent, or Firm—Albert Josif

(57) ABSTRACT

A gardening vehicle, more particularly a lawn-mower, comprising two sections and a composite duct across them: a first section, which comprises a front axle, a driver's seat and a couplings for a tool; and a second section, which comprises an engine with a corresponding transmission, a rear axle and a dump box; the first and the second section, together with the duct elements, being mutually articulated about a common vertical axis so as to perform a steering action.

21 Claims, 4 Drawing Sheets

GARDENING VEHICLE SUCH AS A LAWN-MOWER OR THE LIKE

BACKGROUND OF THE INVENTION

The present invention relates to a gardening vehicle, such as a lawn-mower or the like.

It is known that machines suitable to assist operators in the most labor-intensive gardening tasks have long been used successfully.

In particular, such machines are constituted by self-propelled vehicles provided with tools which allow to perform the most disparate operations, such as cutting grass, trimming hedges, and others.

It is known that these machines must adapt to the most disparate conditions of the terrain and of the application.

The operating situations related to gardening are in fact highly variable according to the types of plant on which work is performed and also depending on the soil in which they are planted.

In particular, almost all machines have a storage unit or, in any case, containers which are adapted to contain the waste of the processes (cut grass).

In particular, the weight of the waste can become considerable and can make the machine substantially unstable, entailing risk for the operator and a drastic reduction in its operating capabilities.

SUMMARY OF THE INVENTION

The aim of the present invention is to provide a gardening vehicle, such as a lawn-mower or the like, whose structure allows it to be highly stable in any operating condition and even if the vehicle is subjected to considerable loads.

Within the scope of this aim, an object of the present invention is to provide a vehicle which is particularly sturdy and flexible from the point of view of operation.

Another object of the present invention is to provide a vehicle whose structure improves its operating capabilities with respect to conventional vehicles.

Another object of the present invention is to improve the turning radius of gardening vehicles.

Another object of the present invention is to provide a vehicle which can be manufactured with conventional technologies and at competitive costs.

These and other objects which will become better apparent hereinafter are achieved by a gardening vehicle, such as a lawn-mower or the like, characterized in that it comprises two sections: a first section, which comprises a front axle, a driver's seat and couplings for a tool; and a second section, which comprises an engine with a corresponding transmission, a rear axle and loading means; said first and second sections being mutually articulated about a vertical axis so as to produce a steering action.

Advantageously, the transmission comprises a hollow body which is fixed to the vehicle chassis in the second section and contains a rotatably coupled sleeve in which the kinematic system for transmission is accommodated, the sleeve being rigidly coupled to a box-like body which contains the rear axle shafts of the vehicle and being free to roll, within specific limits, with respect to the chassis.

BRIEF DESCRIPTION OF THE DRAWINGS

Further characteristics and advantages of the present invention will become better apparent from the following detailed description of an embodiment thereof, illustrated only by way of non-limitative example in the accompanying drawings, wherein.

DESCRIPTION OF THE PREFERRED EMBODIMENTS

Figure 1:
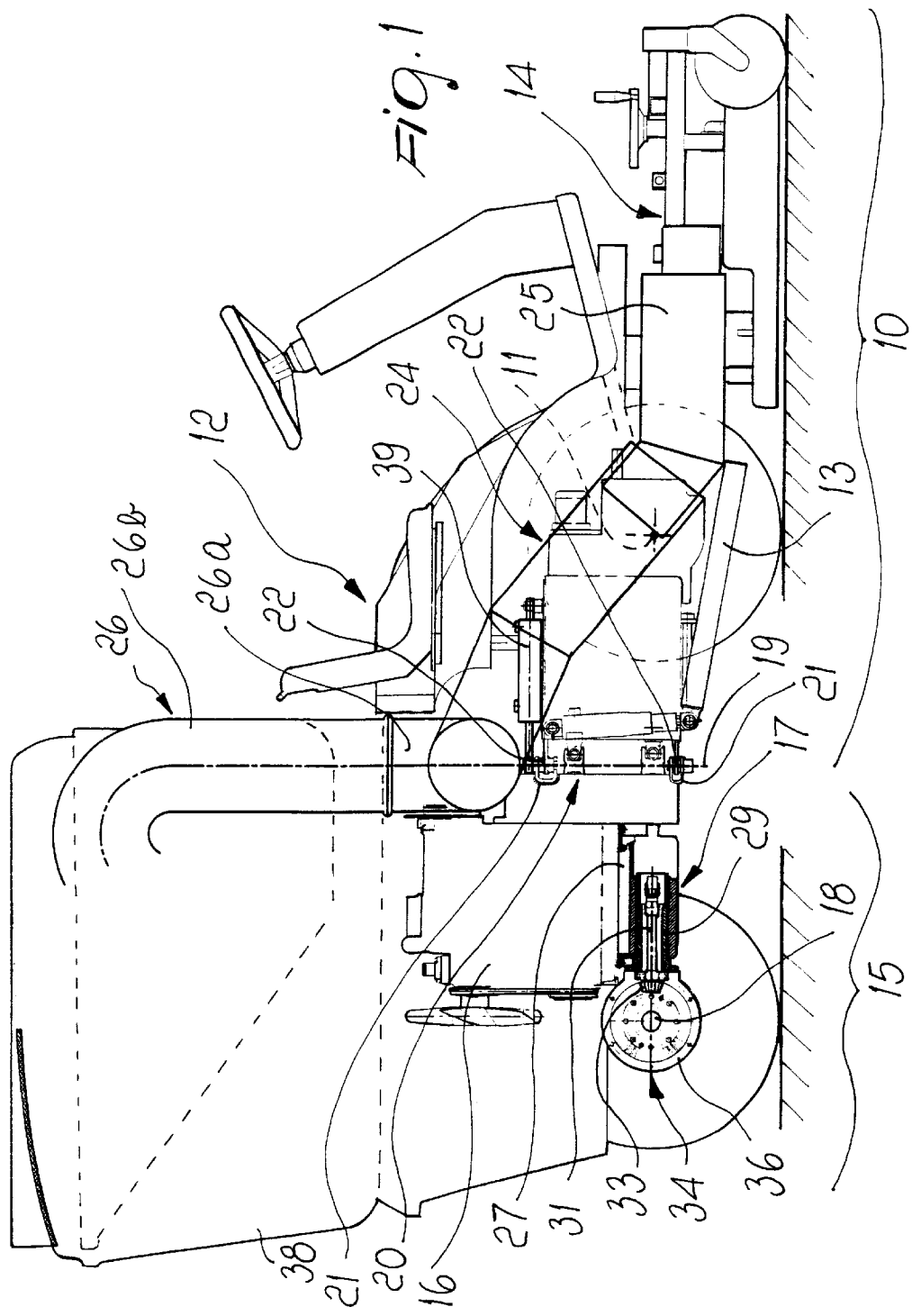
FIG. 1 is a partially sectional side view of a lawn-mower having the structure according to the present invention.
Figure 2:
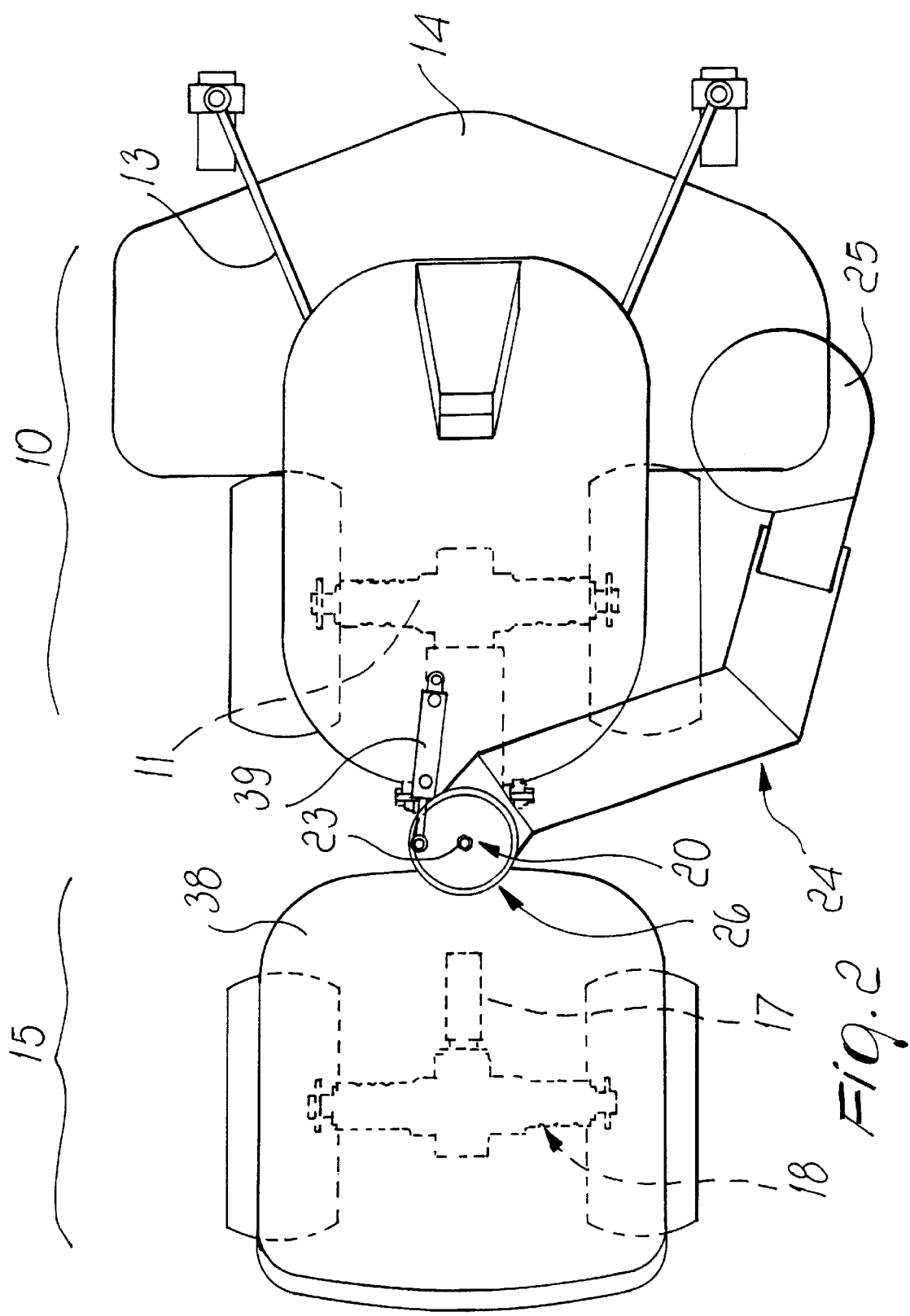
FIG. 2 is a top view of the lawn-mower of FIG. 1.
Figure 3:
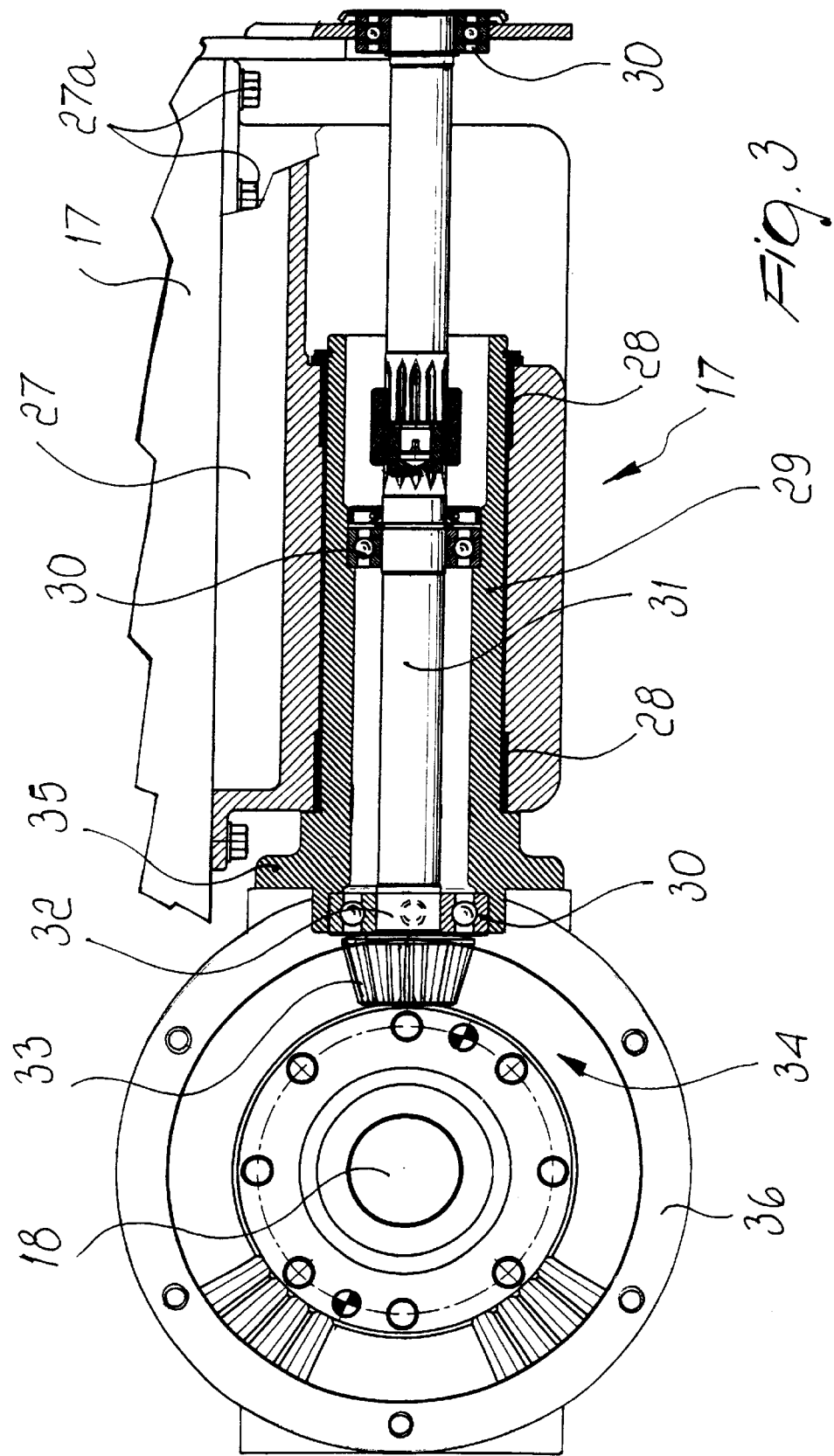
FIG. 3 is a sectional side view of the transmission of the lawn-mower of FIG. 1.
Figure 4:
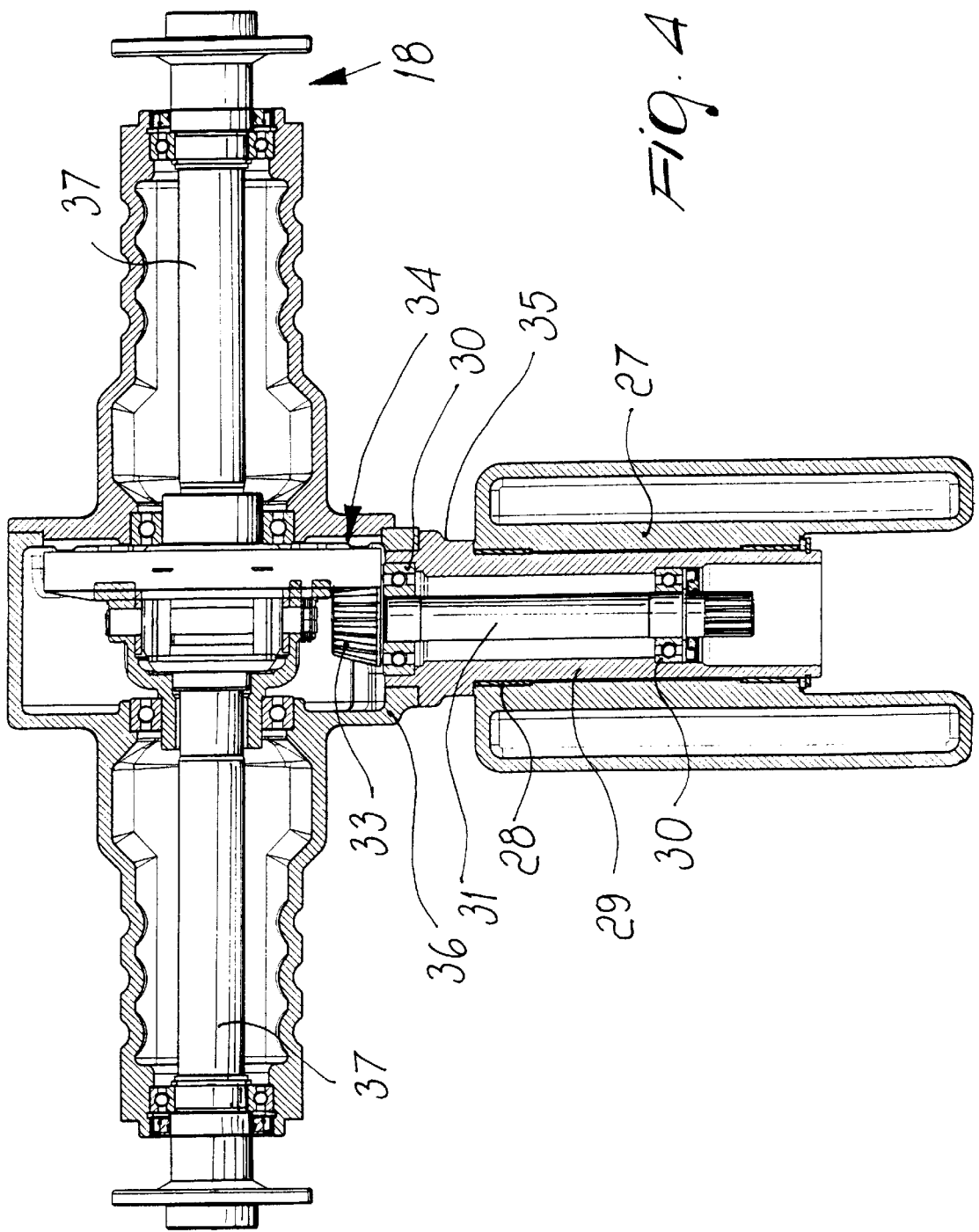
FIG. 4 is another sectional view of the transmission of FIG. 3.

With particular reference to FIGS. 1 to 4, a lawn-mower has a structure which comprises two sections: a first section 10, which comprises a front axle 11, a driver's seat 12 and couplings 13 for a tool 14 (whose protective housing only is visible); and a second section 15, which comprises an engine 16 with a corresponding transmission 17, a rear axle 18 and loading means (dump box) 38 (which is mounted on the brackets, not shown, which support the engine).

Sections 10 and 15 are mutually articulated about a vertical axis 19 so as to produce a steering action.

Articulation is achieved by means of a hinge 20 composed of two C-shaped female components 21 which are mutually superimposed and coaxial, by two respective male components 22 arranged between the wings of the female components, and by articulation pivots 23.

The steering action is achieved by means of a hydraulic or pneumatic actuator 39 which is rigidly coupled between the sections 10 and 15, forming a lever arm with respect to the vertical axis 19.

A composite duct 24, with an impeller 25 for aspirating the cut grass, connects the inside of the housing of the tool 14 to the inside of the dump box 38 and conveniently has a vertical portion 26 which is coaxial to the axis 19 and is divided into two elements 26a and 26b which can rotate with respect to each other so as to follow the movements of the steering system.

The transmission 17, as mentioned, is contained in the second section 15 and comprises a hollow body 27 which is fixed by means of screws 27a to the corresponding section 15 of the vehicle chassis, in which a sleeve 29 is rotatably accommodated, by interposing sliding bearings 28, and can thus roll.

A transmission shaft 31 is inserted in the sleeve 29 and is rotatably supported by rolling bearings, designated by the reference numeral 30.

The transmission shaft 31 protrudes from the bush at its ends; a bevel gear 33 is associated with one of said ends, designated by the reference numeral 32, and is part of a bevel gear pair, generally designated by the reference numeral 34, for transmitting motion to the axle 18 of the rear wheels of the vehicle.

Moreover, the sleeve 29 has a flanged portion 35 which is applied to a box-like body (housing) 36 for containing said bevel gear pair 33 and the axle shafts 37 of the axle 18.

In practice it has been observed that the present invention has achieved the intended aim and objects.

In particular, it should be noted that splitting the vehicle into two mutually articulated sections has increased its operating capabilities because of the improved turning radius.

Moreover, rendering the rear axle fully independent of the chassis in terms of roll allows said axle, which belongs to the part of the vehicle where the containers of process waste are normally installed on the engine supporting brackets, to adapt easily to the most disparate terrain configurations, allowing better overall stability.

It should also be noted that this solution entails absolutely no decrease in the performance of the vehicle and instead ensures at all times optimum operating capabilities thereof in any context of application.

It should also be noted that the result has been achieved by means of a rather simple structural solution which as such in no way substantially alters production costs, which remain substantially competitive with respect to similar transmissions in the field.

The present invention is susceptible of numerous modifications and variations, all of which are within the scope of the inventive concept.

The technical details can be replaced with other technically equivalent elements.

The materials and the dimensions may be any according to requirements.

The disclosures in Italian Patent Application No. PD99A000166 from which this application claims priority are incorporated herein by reference.

What is claimed is:

1. A gardening vehicle comprising:
   a first section including:
   a front chassis,
   a front wheels axle supported by said front chassis,
   a driver's seat mounted on said front chassis,
   a tool supported by said front chassis;
   a second section including:
   a rear chassis,
   an engine mounted on said rear chassis,
   a transmission connected to said engine,
   a rear wheels axle supported by said rear chassis,
   a dump box mounted on said rear chassis;
   an articulation between said first section and second section, said articulation being articulated about a vertical axis so as to produce a steering action,
   a hollow body fixed to said rear chassis,
   a sleeve contained in said hollow body so that said sleeve is rotatable,
   a kinematic transmission system supported by said sleeve, so tat said sleeve and said kinematic transmission system arc free to roll, within specific limits, with respect to the vehicle.

2. The gardening vehicle according to claim 1, wherein said vehicle is a lawn-mower.

3. The vehicle according to claim 1, wherein said articulation about said vertical axis comprises:
   two superimposed C-shaped female components each of said female components having two wings,
   two male components arranged between said wings of respective female components,
   articulation pivots passing through said female and male components along said vertical axis,
   said female components, male components and articulation pivots forming a hinge.

4. The vehicle according to claim 1, comprising a hydraulic actuator, said actuator being rigidly coupled between said first and second sections and forming a lever arm with respect to said vertical axis so as to achieve said steering action.

5. The vehicle according to claim 1, comprising a pneumatic actuator, said actuator being rigidly coupled between said first and second sections and forming a lever arm with respect to said vertical axis so as to achieve said steering action.

6. The vehicle according to claim 1, wherein said kinematic transmission system comprises:
   bearings inserted in said sleeve,
   a transmission shaft supported by said bearings so that said transmission shaft is rotatable,
   a gear housing rigidly coupled to said sleeve,
   rear axle shafts comprised in said gear housing,
   a bevel gear pair comprised in said gear housing,
   said bevel gear pair connecting said transmission shaft to said rear axle shafts for power transmission to the wheels.

7. The vehicle according to claim 6, wherein said sleeve comprises a flanged portion arranged so as to rest against said gear housing, said gear housing containing said axle shafts and said bevel gear pair.

8. A gardening vehicle comprising:
   a first section including:
   a front chassis,
   a front wheels axle supported by said front chassis,
   a driver's seat mounted on said front chassis,
   a tool supported by said front chassis;
   a second section including:
   a rear chassis,
   an engine mounted on said rear chassis,
   a transmission connected to said engine,
   a rear wheels axle supported by said rear chassis,
   a dump box mounted on said rear chassis;
   an articulation between said first section and second section, said articulation being articulated about a vertical axis so as to produce a steering action,
   a hollow body fixed to said rear chassis,
   a sleeve contained in said hollow body so that said sleeve is rotatable,
   a kinematic transmission system supported by said sleeve, so that said sleeve and said kinematic transmission system are free to roll, within specific limits, with respect to the vehicle;
   a tool housing of said tool supported by said front chassis,
   a suction impeller comprised in said tool housing,
   a composite duct connecting sad suction impeller and said dump box, said composite duct including:
   a first vertical element mounted on said first section and arranged along said vertical axis,
   a second vertical element mounted on said second section and coaxially arranged with respect to said first vertical element so as the two coaxial elements are rotatable with respect to each other so as to follow the movements of the steering system.

9. The gardening vehicle according to claim 8, wherein said vehicle is a lawn-mower.

10. The vehicle according to claim 8, wherein said articulation about said vertical axis comprises:
    two superimposed C-shaped female components each of said female components having two wings,
    two male components arranged between said wings of respective female components, articulation pivots passing through said female and male components along said vertical axis,
    said female components, male components and articulation pivots forming a hinge.

11. The vehicle according to claim 8, comprising a hydraulic actuator, said actuator being rigidly coupled between said first and second sections and forming a lever arm with respect to said vertical axis so as to achieve said steering action.

12. The vehicle according to claim 8, comprising a pneumatic actuator, said actuator being rigidly coupled between said first and second sections and forming a lever arm with respect to said vertical axis so as to achieve said steering action.

13. The vehicle according to claim 8, wherein said kinematic transmission system comprises:
   bearings inserted in said sleeve,
   a transmission shaft supported by said bearings so that said transmission shaft is rotatable,
   a gear housing rigidly coupled to said sleeve,
   rear axle shafts comprised in said gear housing,
   a bevel gear pair comprised in said gear housing,
   said bevel gear pair connecting said transmission shaft to said rear axle shafts for power transmission to the wheels.

14. The vehicle according to claim 13, wherein said sleeve comprises a flanged portion arranged so as to rest against said gear housing, said gear housing containing said axle shafts and said bevel gear pair.

15. A gardening vehicle comprising:
   a first section including:
      a front chassis,
      a front wheels axle supported by said front chassis,
      a driver's seat mounted on said front chassis,
      a tool supported by said front chassis;
   a second section including:
      a rear chassis,
      an engine mounted on said rear chassis,
      a transmission connected to said engine,
      a rear wheels axle supported by said rear chassis,
      a dump box mounted on said rear chassis;
   an articulation between said first section and second section, said articulation being articulated about a vertical axis so as to produce a steering action,
   a tool housing of said tool supported by said front chassis,
   a suction impeller comprised in said tool housing,
   a composite duct connecting said suction impeller and said dump box, said composite duct including:
      a first vertical element mounted on said first section and arranged along said vertical axis,
      a second vertical element mounted on said second section and coaxially arranged with respect to said first vertical element so as the two coaxial elements are rotatable with respect to each other so as to follow the movements of the steering system.

16. The gardening vehicle according to claim 15, wherein said vehicle is a lawn-mower.

17. The vehicle according to claim 15, wherein said articulation about said vertical axis comprises:
   two superimposed C-shaped female components each of said female components having two wings,
   two male components arranged between said wings of respective female components, articulation pivots passing through said female and male components along said vertical axis,
   said female components, male components and articulation pivots forming a hinge.

18. The vehicle according to claim 15, comprising a hydraulic actuator, said actuator being rigidly coupled between said first and second sections and foxing a lever arm with respect to said vertical axis so as to achieve said steering action.

19. The vehicle according to claim 15, comprising a pneumatic actuator, said actuator being rigidly coupled between said first and second sections and forming a lever arm with respect to said vertical axis so as to achieve said steering action.

20. The vehicle according to claim 15, wherein said kinematic transmission system comprises:
   bearings inserted in said sleeve,
   a transmission shaft supported by said bearings so that said transmission shaft is rotatable,
   a gear housing rigidly coupled to said sleeve,
   rear axle shafts comprised in said gear housing,
   a bevel gear pair comprised in said gear housing,
   said bevel gear pair connecting said transmission shaft to said rear axle shafts for
   power transmission to the wheels.

21. The vehicle according to claim 20, wherein said sleeve comprises a flanged portion arranged so as to rest against said gear housing, said gear housing containing said axle shafts and said bevel gear pair.

* * * * *